United States Patent [19]
Kobayashi

[11] Patent Number: 6,057,894
[45] Date of Patent: May 2, 2000

[54] PROJECTION TYPE LIQUID CRYSTAL DISPLAY HAVING A DICHROIC PRISM AND POLARIZING AND PHASE SHIFTING PROPERTIES

[75] Inventor: Mikiya Kobayashi, Kanagawa, Japan

[73] Assignee: Sony Corporation, Tokyo, Japan

[21] Appl. No.: 09/172,369

[22] Filed: Oct. 14, 1998

[30] Foreign Application Priority Data

Oct. 15, 1997 [JP] Japan ................................. 9-282156

[51] Int. Cl.[7] ................................................. G02F 1/1335
[52] U.S. Cl. ........................................ 349/5; 349/6; 349/8
[58] Field of Search ......................................... 349/5, 6, 8

[56] References Cited

U.S. PATENT DOCUMENTS

| | | | |
|---|---|---|---|
| 5,153,752 | 10/1992 | Kurematsu et al. | 359/40 |
| 5,161,042 | 11/1992 | Hamada | 359/41 |
| 5,446,510 | 8/1995 | Mitsutake et al. | 353/20 |
| 5,579,138 | 11/1996 | Sannohe et al. | 359/63 |
| 5,694,189 | 12/1997 | Nakamura et al. | 349/143 |
| 5,743,612 | 4/1998 | Matsuda et al. | 353/97 |
| 5,757,443 | 5/1998 | Kobayashi | 349/5 |
| 5,875,008 | 2/1999 | Takahara et al. | 349/5 |
| 5,880,795 | 3/1999 | Nagata et al. | 349/5 |

FOREIGN PATENT DOCUMENTS

| | | |
|---|---|---|
| 2-220040 | 9/1990 | Japan . |
| 403126011A | 5/1991 | Japan . |
| 4-60538 | 2/1992 | Japan . |
| 5-273404 | 10/1993 | Japan . |
| 9-113906 | 5/1997 | Japan . |
| 9-120046 | 5/1997 | Japan . |
| 9-218463 | 8/1997 | Japan . |

OTHER PUBLICATIONS

H. Hamada et al. "A New High Definition Microlens Array Built in p–Si TFT–LCD Panel, Asia Display '95" pp. 887–890.

Primary Examiner—James Dudek
Assistant Examiner—Tarifur R. Chowdhury
Attorney, Agent, or Firm—Ronald P. Kananen; Rader, Fishman, & Grauer

[57] ABSTRACT

A projection type liquid crystal display according to the present invention comprises a dichroic prism for separating or synchronizing a light to provide fundamental colors for color display, and a unit for enlarging and projecting a transmitted light from the liquid panel. The liquid panel has one surface fixedly attached to a transparent member and the other surface integral with the dichroic prism directly or through at least one optical component. In the projection type liquid crystal display, the light which provides fundamental colors for color display and is separated or synchronized at the dichroic prism is incident on the light incidence surface of the liquid panel through the transparent member or the dichroic prism without contacting with the air in the space. The light incident on the liquid crystal panel is irradiated from the light outgoing surface of the liquid crystal panel through the transparent member or the dichroic prism without contacting with the air in the space and thereafter enlarged and projected. With this arrangement, it is possible to simplify the structure of the peripheral optical systems of the liquid crystal panel and to improve image quality.

16 Claims, 10 Drawing Sheets

PROJECTION TYPE LIQUID CRYSTAL DISPLAY HAVING A DICHROIC PRISM AND POLARIZING AND PHASE SHIFTING PROPERTIES

BACKGROUND OF THE INVENTION

1. Field of the Invention

The present invention relates to a projection type liquid crystal display for projecting a light modulated spatially in accordance with an image for displaying.

2. Description of the Related Art

As a projection type liquid crystal display used to appreciate images and so forth, a liquid crystal projector, for example, wherein a light from a light source is irradiated on a liquid crystal panel and spatially modulated and the light transmitted through the liquid crystal panel is projected onto a screen or the equivalent by a projection optical system to display an image, has been conventionally developed.

Projection type liquid crystal displays involve a single-panel mode display using a liquid crystal panel provided with three types of color filters, i.e., R (red), G (green) and B (blue) filters and a three-panel mode display wherein monochrome liquid panels are provided in optical paths for B, R and G, respectively.

The color projection type liquid crystal display using a single-panel mode has a simple structure and is small-sized, light-weight and inexpensive. It is, however, disadvantageous in realizing high luminance due to large amounts of absorption of light by color filters and in cooling. To deal with such disadvantages, a projection type liquid crystal display consisting of a single-panel mode which does not employ color filters has been developed. For example, Japanese Published Unexamined Patent Application No. 4-60538 which corresponds to U.S. Pat. No. 5,161,042 or "ASIA DISPLAY '95", page 887 discloses a single-panel mode color liquid crystal display which places a condensing microlens for every set of three pixels to face each other, in which three colors of B, R, and G are incident from different directions and condensed on respective lenses and that the outgoing lights are incident on pixels corresponding to the three colors of B, R, and G, respectively. In the color liquid crystal display of this type, the light incident on the region (i.e. the black matrix portion in which a thin film transistor, or TFT serving as a switching device for driving pixels) between pixels can be effectively utilized and actual aperture ratio increases, which allows high luminance.

FIG. 1 is a block diagram showing an example of a single-panel mode projection type liquid crystal display which does not employ color filters. The projection type liquid color display comprises a light source 101, a UV (ultraviolet)-IR (infrared) cut filter 102, a glass rod integrator 103, a relay lens 104 and a collimator lens 105. With this arrangement, when a white light is emitted from the light source 101, the ultraviolet and infrared of the white light are removed by the UV-IR cut filter 102. Thereafter, uniform illuminance distribution is obtained by the glass rod integrator 103 and, at the same time, the resultant light is transmitted by the relay lens 104 and the collimator lens 105 and is emitted as a parallel light with a predetermined width.

The projection type liquid crystal display also comprises a dichroic mirror 106 for selectively separating the parallel light emitted from the collimator lens 105 into three colors of B, R and G which are fundamental colors for color display and emitting the light, an incidence side polarizing plate 107 for linearly polarizing the lights of three colors of B, R and G separated by the dichroic mirror 106, respectively, a liquid crystal panel 108 for spatially modulating the lights of three colors of B, R and G which have been linearly polarized by the incidence side polarizing plate 107 in accordance with an image for displaying, an outgoing side polarizing plate 109 for transmitting only the light polarized in a predetermined direction among the lights spatially modulated by the liquid crystal panel 108 and a projection lens 110 for projecting the light transmitted by the outgoing side polarizing plate 109 onto the screen. The incidence side polarizing plate 107 and the liquid crystal panel 108 are located with predetermined distances from the dichroic mirror 106, respectively.

The dichroic mirror 106 includes three mirrors, that is, a mirror 106B for B, a mirror 106R for R and a mirror 106G for G for selectively reflecting the lights of three colors of B, R and G, respectively. The mirrors 106B, 106R and 106G include color adjustment and holding mechanisms (not shown) for setting incident angles of lights of respective colors of R, G, and B incident on the liquid crystal panel 108 from different directions, respectively.

In the projection type liquid crystal display as described above, the white light emitted from the light source 101 is separated into lights of three colors of R, G and B by the three dichroic mirrors 106R, 106G and 106G. The separated color lights are incident from different angles on the liquid panel 108 which is provided independently of the dichroic mirrors 106R, 106G and 106B.

FIG. 2 is a block diagram showing an example of a three-panel mode projection type liquid crystal display. The projection type liquid crystal display of this type comprises a light source 201 having the same function as in the single-panel mode projection type liquid crystal display shown in FIG. 1, a UV-IR cut filter 202, a glass rod integrator 203, a relay lens 204 and a collimator lens 205. A ray of white light from the light source 201 is transmitted by the collimator lens 205 and emitted as a parallel light.

The projection type liquid crystal display also comprises dichroic mirrors 206R, 206G and 206B, provided on the same optical path at predetermined intervals, for selectively separating the parallel light emitted from the collimator lens 205 into lights of three colors of R, G and B which are fundamental colors for color display, a reflection mirror 207 for further reflecting the light of color R reflected by the dichroic mirror 206R in a predetermined direction, a reflection mirror 208 for further reflecting the light of color B reflected by the dichroic mirror 206B in a predetermined direction, incidence side polarizing plates 209R, 209G and 209B for linearly polarizing the lights of three colors of R, G and B which have been separated by the dichroic mirrors 206R, 206G and 206B, respectively, monochrome liquid panels 210R, 210G and 210B for spatially modulating the lights of three colors of R, G and B which have been linearly polarized by the incidence side polarizing plates 209R, 209G and 209B, respectively, outgoing side polarizing plates 211R, 211G and 211B for transmitting only the light polarized in a predetermined direction among the lights spatially modulated by the liquid crystal panels 210R, 210G and 210B, a color synthesizing dichroic prism 212 for synthesizing the lights of three colors of R, G and B transmitted by the outgoing side polarizing plates 211R, 211G and 211B and a projection lens 213 for projecting the light synthesized by the color synthesizing dichroic prism 212 onto a screen 111.

The color synthesizing dichroic prism 212 is a cubical prism. The dichroic prism 212 has incidence surfaces 212R, 212G and 212B on which the lights of three colors of R, G and B are incident, respectively. The incidence side polarizing plate 209R, the liquid crystal panel 210R and the outgoing side polarizing plate 211R are arranged to face the incidence surface 212R of the color synthesizing dichroic prism 212. The incidence side polarizing plate 209G, the liquid crystal panel 210G and the outgoing side polarizing plate 211G are arranged to face the incidence plane 212G perpendicular to the incidence surface 212R of the dichroic prism 212. The incidence side polarizing plate 209B, the liquid crystal panel 210B and the outgoing side polarizing plate 211B are arranged to face the remaining incidence plane 212B parallel to the incidence surface 213R of the color synthesizing dichroic prism 212.

The incidence side polarizing plates 209R, 209G and 209B as well as the liquid crystal panels 210R, 210G and 210B are arranged at a distance from the dichroic mirror 212, respectively.

In the three-panel mode projection type liquid crystal display of this type, the lights of three colors of R, G and B separated by the dichroic mirrors 206R, 206G and 206B are linearly polarized by the incidence side polarizing plates 209R, 209G and 298B and then incident on the liquid crystal panels 210R, 210G and 210B through the air in the space, respectively. The lights emitted from the liquid crystal panels 210R, 210B and 210B are incident on the outgoing side polarizing plates 211R, 211G and 211B and the lights of three colors of R, G and B transmitted by the outgoing polarizing plates 211R, 211G and 211B are incident on the incident surfaces 212R, 212G and 212B of the color synthesizing dichroic prism 212 through the air in the space, respectively. The lights of three colors of R, G and B incident on the incident surfaces 212R, 212G and 212B of the color synthesizing dichroic prism 212 are color-synthesized by the action of the color synthesizing dichroic prism 212 and thereafter projected onto the screen 111 through the projection lens 213.

The projection type liquid crystal displays of these various types as described above have the following disadvantages. Since the liquid crystal panels are arranged to be completely separated from other optical components such as dichroic mirrors, contaminants such as dusts and dirt are easily attached to the surfaces of the liquid panels, resulting in a deterioration in image quality and a decrease in light quantity. Due to the separate arrangement of the liquid panels from their peripheral optical components, simple structure cannot be sufficiently realized.

Furthermore, in the above-stated various types of projection type liquid crystal displays, to keep off the heat generated from the liquid panels, cooling fans (not shown) are usually provided to blow airs to thereby cool the crystal panels. As described above, however, the liquid crystal panels are separately arranged from other optical components and the surfaces thereof come into contact with the air of low heat conductivity. Due to this, the cooling effect of the cooling fans are lowered, which adversely affects image quality. To improve the cooling effect, it is necessary to increase the rotation rate of the cooling fans, If so, however, noises are produced unnecessarily by the cooling fans themselves as well as the blow from the fans.

In the single-panel mode projection type liquid crystal display as shown in FIG. 1, in particular, it is required to keep spaces corresponding to the thicknesses of the three dichroic mirrors 106B, 106R and 106G and color adjustment and holding mechanisms for setting incident angles of lights of respective colors of R, G and B incident on the liquid crystal panel 108 in different directions. This arrangement disadvantageously provides a large-sized structure. Besides, due to irregular thickness in the three dichroic mirrors 106B, 106R and 106G produced in manufacturing process, it is difficult to dispense with the adjustment of incident angles and to expect the satisfactory accuracy of the reflection angle. Additionally, contaminants such as dust and dirt are easily attached to the front and rear surfaces of the three dichroic mirrors 106B, 106R and 106G, resulting in a deterioration in image quality and a decrease in light quantity. Mixture of colors occurs due to stray lights reflected on the rear surfaces of the dichroic mirrors 106B, 106R and 106G, thereby lowering image quality.

In the three-panel mode projection type liquid crystal display as shown in FIG. 2, in particular, the color synthesizing dichroic prism 212 is separately provided from other optical components and clearances are given in the spaces of the incidence surfaces 212R, 212G and 212B, respectively. Owing to this, contaminants such as dust and dirt are easily attached to the incidence surfaces 212R, 212G and 212B, thereby resulting in a deterioration in image quality and a decrease in light quantity. In addition, the lights reflected on the incidence surfaces 212R, 212G and 212B become stray lights to thereby deteriorate image quality.

SUMMARY OF THE INVENTION

The present invention is designed to overcome the problems described above. It is an objective of the invention to provide a projection type liquid crystal display capable of simplifying the structure of peripheral optical system of the liquid crystal panel and capable of improving image quality.

A projection type liquid crystal display according to the present invention comprises a dichroic prism for separating or synchronizing a light to provide fundamental colors for color display; a liquid crystal panel having a surface serving as a light incidence surface and a surface serving as a light outgoing surface, a transparent member being fixedly attached to one of the surfaces of the liquid crystal panel, another surface of the liquid crystal panel provided integrally with the dichroic prism directly or through at least one optical component; and means for enlarging and projecting a transmitted light from the liquid crystal panel.

Another projection type liquid crystal display according to the present invention comprises a dichroic prism, having a plurality of light incidence surfaces corresponding to a plurality of colors which are fundamental colors for color display, for synchronizing the plurality of colors incident on the light incidence surfaces; and a plurality of liquid crystal panels each having a surface serving as a light incidence surface and a surface serving as a light outgoing surface, a transparent member fixedly attached to the light incidence surface, the light outgoing surface provided integrally with one of the plurality of light incidence surfaces of the dichroic prism directly or through at least one optical component.

In the projection type liquid crystal display according to the present invention, the light which provides fundamental colors for color display and is separated or synchronized at the dichroic prism, is incident on the light incidence surface of the liquid panel through the transparent member or the dichroic prism without contacting with the air in the space. The light incident on the liquid crystal panel is irradiated from the light outgoing surface of the liquid crystal panel through the transparent member or the dichroic prism without contacting with the air in the space and thereafter enlarged and projected.

In another projection type liquid crystal display according to the present invention, the light which provides fundamental colors for color display and is separated at the dichroic prism, is incident on a plurality of liquid crystal panels integral with the dichroic prism directly or through at least one optical component without contacting with the air in the space. The plurality of lights incident on the liquid crystal panels are incident on the dichroic prism directly or through at least one optical component without contacting with the air in the space, and thereafter enlarged and projected.

Other and further objects, features and advantages of the invention will appear more fully from the following description.

DETAILED DESCRIPTION OF THE PREFERRED EMBODIMENT

Embodiments according to the present invention will now be described with reference to the drawings.

First, description will be given to the first embodiment according to the present invention.

Figure 3:
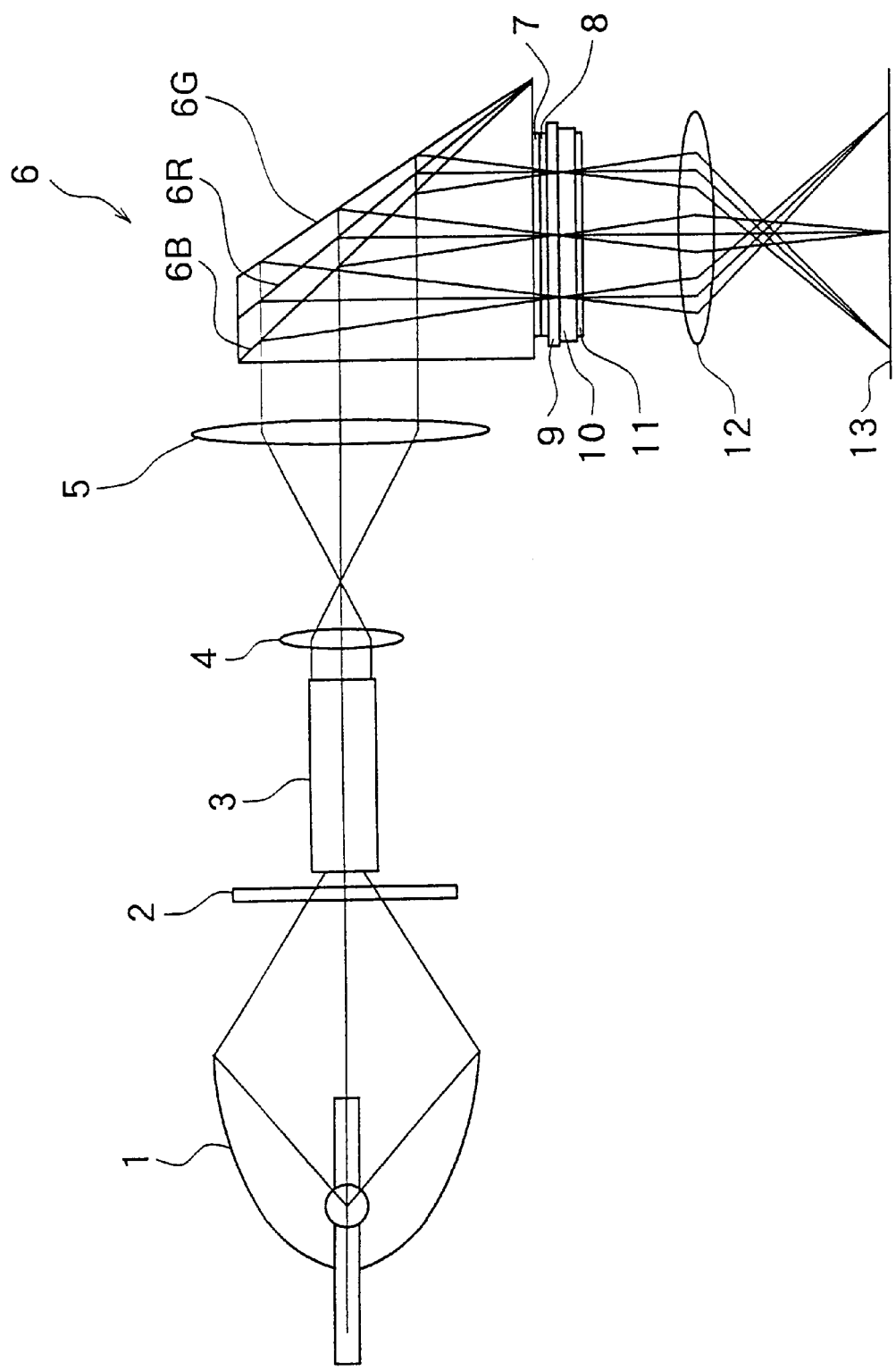
FIG. 3 is a block diagram showing an example of a single-panel mode liquid crystal projector as a projection type liquid crystal display in the first embodiment according to the present invention.

FIG. 3 is a block diagram showing an example of a projection type liquid crystal display in the first embodiment according to the present invention. The projection type liquid crystal display is a single-panel mode projection which does not employ color filters. It comprises a light source 1 for emitting a white light, a UV-IR cut filter 2 for removing ultraviolet and infrared included in the white light emitted from the light source 1, a glass rod integrator 3 for diffusing the light transmitted by the UV-IR cut filter 2 and emitting a parallel light having uniform distribution of light illuminance, a relay lens 4 for condensing the parallel light emitted from the glass rod integrator 3 and forming a light source image, and a collimator lens 5 for forming a telecentric optical system together with the relay lens 4 and emitting the light condensed by the relay lens 4 as a parallel light having a predetermined width.

The projection type liquid crystal display in this embodiment also comprises a color separation dichroic prism 6 for selectively separating and irradiating a parallel light emitted from the collimator lens 5 into lights of three colors of B, R and G which are fundamental colors for color display, an incidence side polarizing plate 7 for linearly polarizing the lights of three colors of B, R and G separated by the color separation dichroic prism 6, a phase shift plate 8 for setting predetermined phase difference among the lights of three colors of B, R, and G linearly polarized by the incidence side polarizing plate 7, a liquid crystal panel 9 for spatially modulating the lights of three colors of B, R and G transmitted by the phase shift plate 8 in accordance with a image for displaying, a glass plate 10 serving as a transparent member fixedly attached to the light outgoing surface of the liquid crystal panel 9, an outgoing side polarizing plate 11 for transmitting only the light polarized in a predetermined direction among the lights spatially modulated by the liquid panel 9 and a projection lens 12 for projecting the light transmitted through the outgoing side polarizing plate 11 onto a screen 13. The projection type liquid crystal display in the embodiment according to the present invention is also provided with a cooling fan (though not shown) for keeping off the heat generated from the liquid crystal panel 9.

The color separation dichroic prism 6, the incidence side polarizing plate 7, the phase shift plate 8, the liquid crystal panel 9, the glass plate 10 and the outgoing side polarizing plate 11 are provided integrally with one another. Specifically, one surface of the incidence side polarizing plate 7 provided on the light incidence side surface of the liquid crystal panel 9 is fixedly attached to the light outgoing surface of the color separation dichroic prism 6 by predetermined adhesive agent. The other surface of the incidence side polarizing plate 7 is fixedly attached to one surface of the phase shift plate 8. The other surface of the phase shift plate 8 is fixedly attached to one surface (or light incidence surface) of the liquid panel 9. The glass plate 10 serving as a transparent member is fixedly attached to the other surface (or light outgoing surface) of the liquid panel 9. Since the phase shift plate 8 is provided to give different phases to incident lights in accordance with the orientation directions (rubbing directions) of liquid crystal molecules within the liquid crystal panel 9, the phase shift plate 8 may not be provided depending on the orientation directions of the liquid crystal molecules within the liquid crystal panel 9.

A halogen lamp, a metal hydrant lamp and the like are used as the light source 1. The glass rod integrator 3 is provided to diffuse the white light emitted from the light source 1 and to ensure a uniform illuminance distribution of the surface of the liquid crystal panel 9.

The color separation dichroic prism 6 includes three reflection surfaces 6B, 6R and 6G for selectively reflecting B, R and G lights and for separating the white light into lights of three primary colors of B, R and G. Each of the reflection surfaces 6B, 6R and 6G is formed of a predetermined dielectric multi-layer film and set such that the lights of colors of B, R and G are incident on the liquid crystal panel 9 at predetermined angles different from one another. By so setting, only the lights of R, G and B, out of the lights incident on the color separation dichroic prism 6 from the light source 1, are reflected toward the liquid crystal panel 9 and other compositions are transmitted.

As described above, by using the color separation dichroic prism 6 instead of the conventionally used dichroic mirrors, a smaller-size optical system can be provided and, at the same time, the simple adjustment can be realized because of no need to adjust an angle for every mirror during installation as done conventionally.

The light incidence surface of the liquid crystal panel 9 is fixedly attached to and arranged integrally with the light outgoing side of the color separation dichroic prism 6 through the phase shift plate 8 and the incidence side polarizing plate 7. The glass plate 10 is fixedly attached to the light ongoing side surface of the liquid crystal panel 9. Since the liquid crystal panel 9 has front and rear surfaces directly fixed to the phase shift plate 8 and the glass plate 10, respectively, no contaminants such as dust and dirt are attached to the front and rear surfaces of the liquid crystal panel 9. The liquid crystal panel 9 comprises a pixel substrate on which many pixel electrodes corresponding to the three colors of B, R and G, an opposite substrate on which many microlenses are formed and a liquid crystal layer put between the pixel substrate and the opposite substrate. In the liquid crystal panel 9, lights of three colors of B, R and G, which are incident from different directions, are condensed onto the respective microlenses and the condensed lights are incident on the pixels corresponding to the three colors of B, R and G, respectively. The liquid crystal panel 9 is driven by a predetermined drive circuit which is not shown.

The color separation dichroic prism 6 and the glass plate 10 are preferably made of glass members which can easily conduct the heat generated from the liquid crystal panel 9 (such as a glass member with heat conductivity of not less than 1.0 W/m·K). These glass members involve, for example, a borosilicate crown glass (such as BK 7 of Shot Company) and a borosilicate glass (such as #7059 of Corning Company). The glass plate 10 has preferably a thickness of 1 mm or more in consideration of, for example, the influence of stress caused by the heat generated from the liquid crystal panel 9.

As can be seen from the above description, in this embodiment, the color separation dichroic prism 6 and the glass plate 10 provided integrally with the liquid crystal panel 9 are made of members with good heat conductivity, thereby facilitating the removal of the heat discharged from the liquid crystal panel 9. For purposes of removing the heat, a cooling member may be further provided in a predetermined position of either the color separation dichroic prism 6 or of the glass plate 10.

Figure 4:
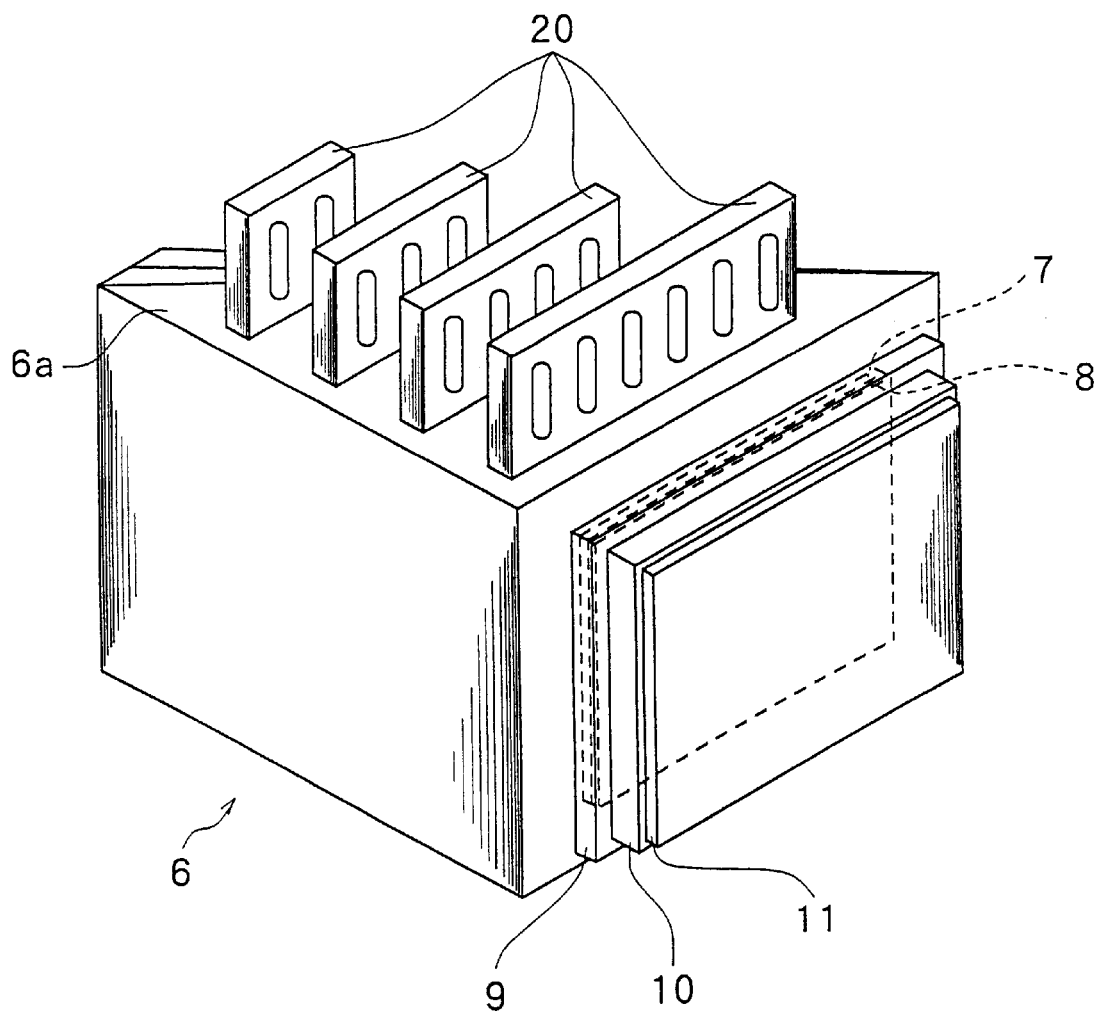
FIG. 4 is a perspective view showing the structure of the periphery of a liquid crystal panel in the projection type liquid crystal display of FIG. 3.
Figure 5:
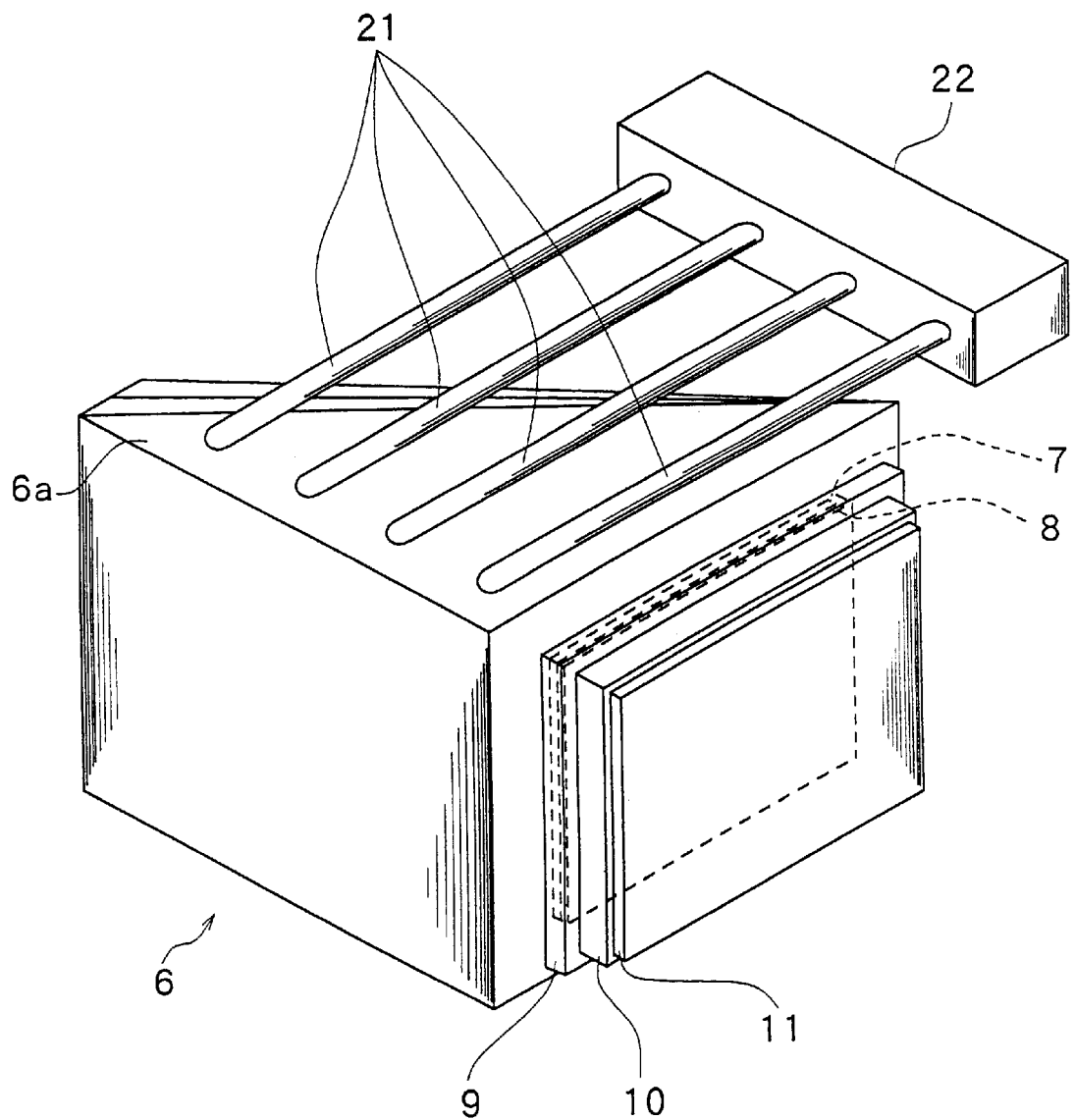
FIG. 5 is a perspective view showing another example of the structure of the periphery of the liquid crystal panel in the projection type liquid crystal display of FIG. 3.

FIGS. 4 and 5 are perspective views for showing the peripheral structure of the liquid crystal panel 9 and for explaining an example of installation of a cooling member. In the example shown in FIG. 4, a plurality of radiation shields 20 made of, for example, copper or aluminum are fixedly installed as cooling members on one surface 6a of the color separation dichroic prism 6 that does not contribute to the incidence and emission of light. In the example shown in FIG. 5, a plurality of heat pipes 21 are fixedly installed as cooling members on the surface 6a of the color separation dichroic prism 6. The heat pipes 21 are also connected to a Peltier device 22 serving as a cooling members and having a Peltier effect. The cooing members stated above may be provided on another surface of the glass plate 10 that does not contribute to the light incidence and emission instead of providing the surface 6a of the prism 6.

The function of the projection type liquid crystal display of such a structure as mentioned above will be now described.

As shown in FIG. 3, first, the UV-IR cut filter 2 removes ultraviolet and infrared from the white light rays emitted from the light source 1. The light transmitted through the UV-IR cut filter 2 is diffused at the glass rod integrator 3 and a parallel light having uniform light illuminance distribution is irradiated. Once the parallel light irradiated from the glass rod integrator 3 is converged into the relay lens 4, the parallel light is irradiated as a parallel light having a predetermined width by the collimator lens 5 which forms, together with the relay lens 4, a telecentric optical system and the light is incident on the color separation dichroic prism 6.

The parallel light incident on the color separation dichroic prism 6 from the collimator lens 5 is selectively separated by the action of the reflection surfaces 6B, 6R and 6G of the prism 6 into lights of three colors of B, R and G which are fundamental colors for color display. The lights of three colors of B, R and G are linearly polarized by the incidence side polarizing plate 7 fixedly attached to the light outgoing side of the color separation dichroic prism 6, respectively. The linearly polarized lights are given predetermined phases in accordance with orientation directions of liquid crystal molecules within the liquid crystal panel 9 by the phase shift plate 8 and are then incident on the liquid crystal panel 9. The liquid crystal panel 9 spatially modulates and irradiates the lights of three colors of B, R and G transmitted through the phase shift plate 8 in accordance with an image for display. The light irradiated from the liquid crystal panel 9 is incident on the outgoing side polarizing plate 11 through the glass plate 10 fixedly attached to the light outgoing side of the liquid crystal panel 9. The light transmitted through the outgoing side polarizing plate 11 is projected onto the screen 13 through the projection lens 12.

Next, the cooling function in a case when cooling members are installed in the predetermined positions of the color separation dichroic prism 6 will be described.

As shown in FIGS. 4 and 5, the heat generated from the liquid crystal panel 9 is conducted to the color separation dichroic prism 6 through the incidence side polarizing plate 7 and the phase shift plate 8. The heat thus conducted to the color separation dichroic prism 6 is further conducted to the radiation sheets 20 (in FIG. 4) installed on one surface 6a of the prism 6 that do not contribute to the incidence and irradiation of light or the heat pipes 21 (in FIG. 3) connected to the Peltier device 22. The heat is discharged to the outside of the optical system through these cooling members. By so doing, it is possible to prevent temperature increase caused by the heat generated from the liquid crystal panel 9. As a result, it is possible to prevent a deterioration in the image quality of the liquid crystal panel caused by the temperature increase and to decrease noises deriving from the air blow for cooling.

As described above, in the projection type liquid crystal display in the embodiment according to the present invention, not the conventionally used dichroic mirrors but a color separation dichroic prism 6 is used. With such an arrangement, the present invention dispenses with color adjustment and holding mechanisms provided on the plurality of color separation dichroic mirrors installed in the plurality of conventional color separation dichroic mirrors to thereby make it possible to reduce the size of the optical system, and dispenses with the need to make an angle adjustment for every mirror as conventionally done during installation to thereby make it possible to realize simplified adjustment. In addition, owing to the provision of peripheral optical components of the liquid crystal panel 9 as well as the liquid crystal panel 9 integrally with the color separation dichroic prism 6, a smaller-sized optical system can be realized.

Besides, the integrally provided optical components help prevent a deterioration in image quality caused by the dichroic mirrors conventionally provided. Moreover, since the surface of the liquid crystal panel 9 and the light outgoing surface of the color separation dichroic prism 6 are not exposed to the air, the light separated at the dichroic prism 6 is irradiated through the glass plate 10 from the liquid crystal panel 9 to which the glass plate 10 is fixedly attached without contact with the air. This can prevent contaminants such as dusts and dirt from being attached to the surface of the liquid crystal panel 9 and that of the color separation dichroic prism 6 and can reduce the surface reflection of light to thereby prevent stray light from occurring and to prevent a deterioration in image quality.

In addition, the color separation dichroic prism 6 and the glass plate 10 integrally provided with the liquid crystal panel 9 are made of members which can easily conduct the heat generated from the liquid crystal panel 9. The cooling members are provided in predetermined positions of the color separation dichroic prism 6 or of the glass plate 10. Due to this, the heat discharged from the liquid crystal panel 9 can be easily removed and a good cooling effect is produced. As a result, it is possible to prevent optical characteristics of the peripheral optical system of the liquid crystal panel 9 from being changed by the heat and to prevent a deterioration in image quality. By improving a cooling effect, brighter light can be incident on the system to make it possible to realize bright image display. Due to the excellent cooling effect, the burden of the cooling fans is eased and noises and the like resulting from the fans can be reduced.

One surface of the liquid crystal panel 9 is integrally provided with the color separation dichroic prism 6 having high heat conductivity and the other surface thereof is exposed to the space having low heat conductivity, for example. If so, only one side of the liquid panel 9 is cooled with cooling fans more than required and temperature gradients occur on front and rear surfaces of the liquid crystal panel 9. With this, stress occurs to the liquid crystal panel 9, the liquid crystal layer becomes uneven and image quality may possibly deteriorate greatly. In this embodiment, however, the color separation dichroic prism 6 and the glass plate 10 are integral with the front and rear surfaces of the liquid crystal panel 9, respectively. The problem mentioned above does hardly occur.

In the projection type liquid crystal display in the embodiment according to the present invention, the structure of the peripheral optical system of the liquid crystal panel 9 can be simplified and an improvement in image quality can be promoted.

Next, the second embodiment according to the present invention will be described.

Figure 1:
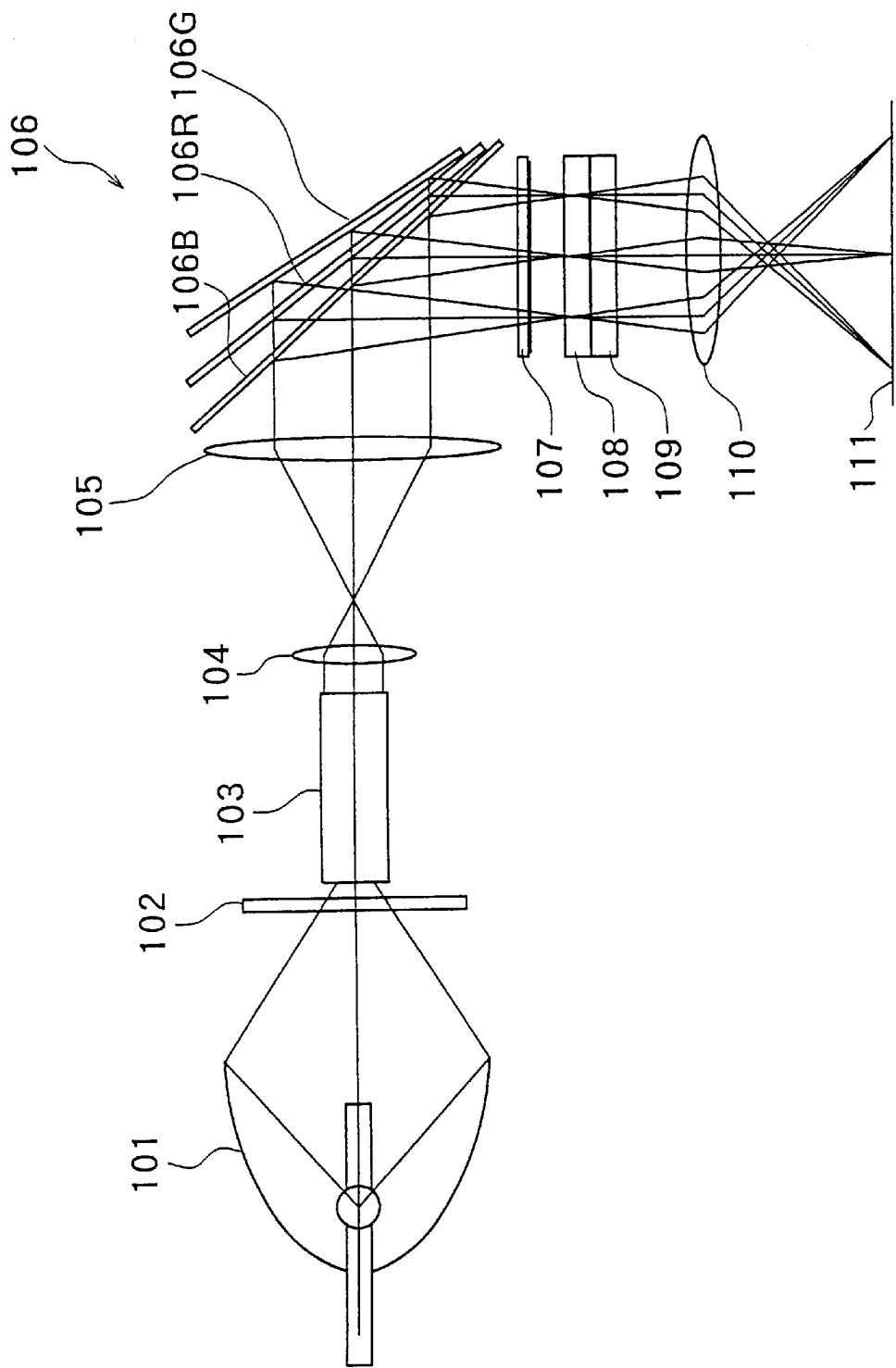
FIG. 1 is a block diagram showing an example of a single-panel mode projection type liquid crystal display.
Figure 2:
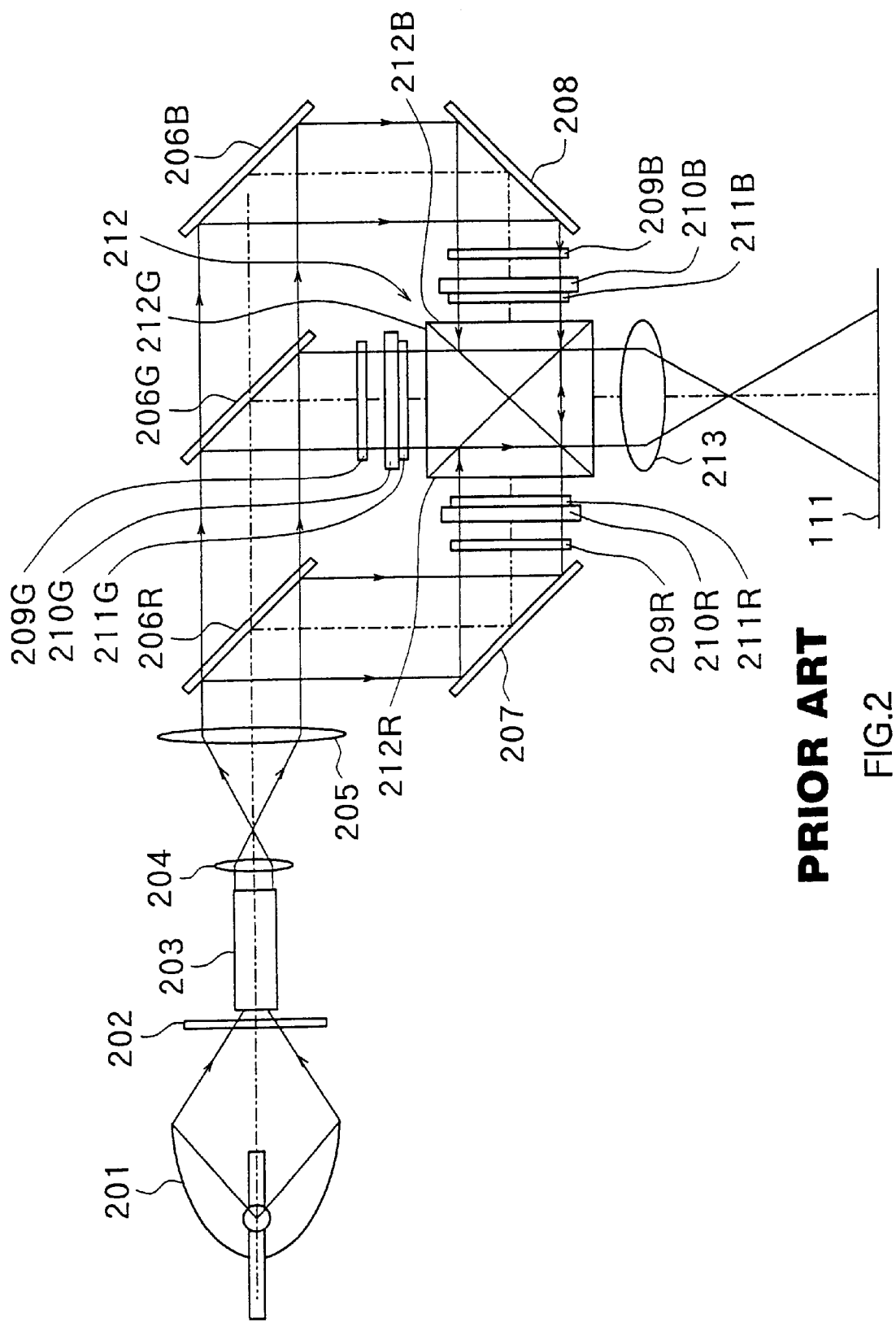
FIG. 2 is a block diagram showing an example of a three-panel mode projection type liquid crystal display.
Figure 6:
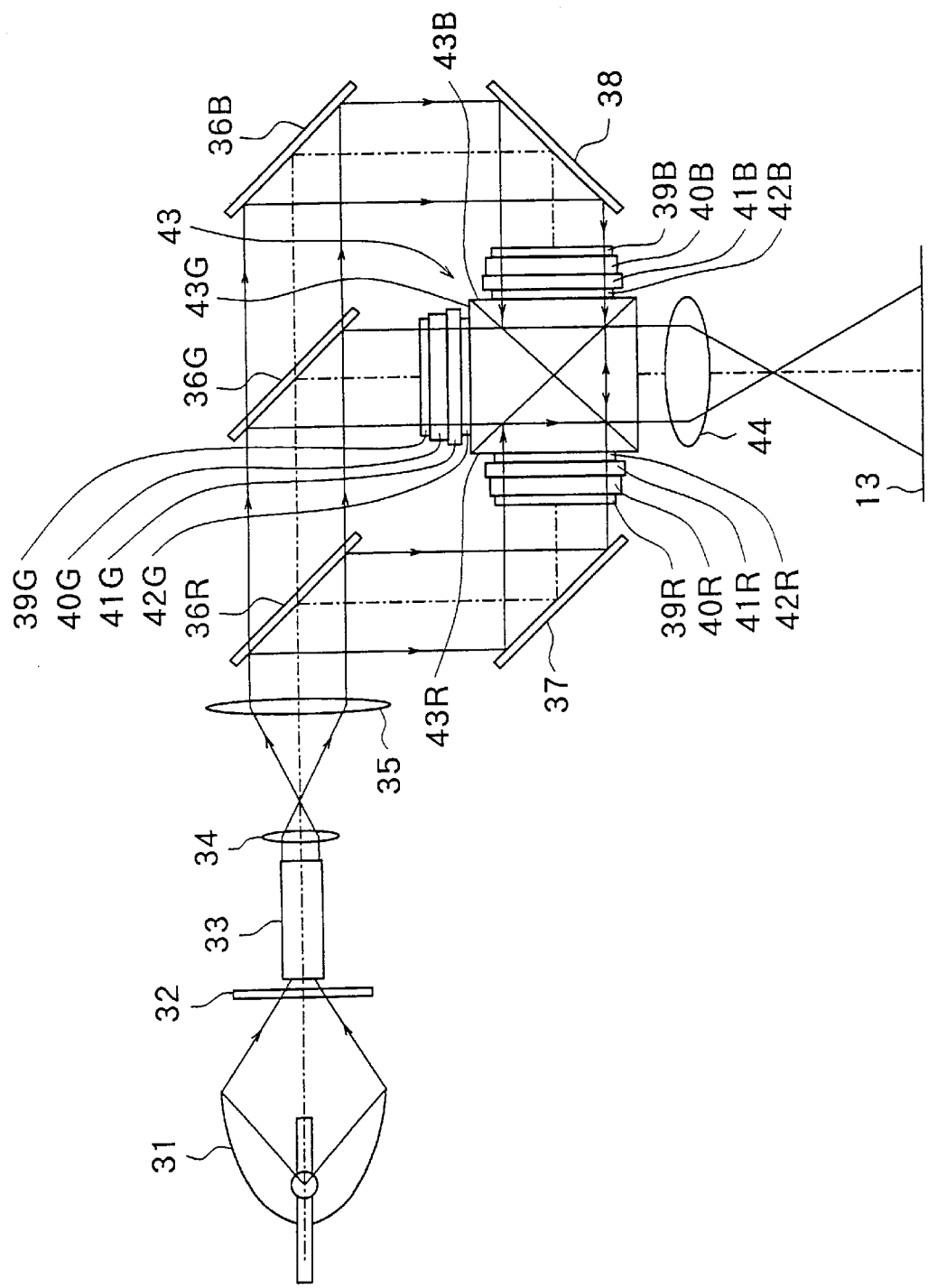
FIG. 6 is a block diagram showing an example of a three-panel mode liquid crystal projector as a projection type liquid crystal display in the second embodiment according to the present invention.

FIG. 6 is a block diagram showing one example of a projection type liquid crystal display in the second embodiment according to the present invention. The display is a three-panel mode liquid crystal projector which employs three monochrome liquid crystal panels. The display comprises a light source 31 having the same function as that in the projection type liquid crystal display in the first embodiment shown in FIG. 3, a UV-IR cut filter 32, a glass rod integrator 33, a relay lens 34 and a collimator lens 35. As in the case of the projection type liquid crystal display shown in FIG. 1, a white light emitted from the light source is transmitted by the collimator lens 35 and irradiated as a parallel light with a predetermined width.

The projection type liquid crystal display in this embodiment also comprises dichroic mirrors 36R, 36G and 36B, provided on the same optical path at predetermined intervals, for selectively separating a parallel light irradiated from the collimator lens 35 into lights of three colors of R, G and B which are fundamental colors for color display, a reflection mirror 37 for further reflecting the light of color R reflected by the dichroic mirror 36R in a predetermined direction, a reflection mirror 38 for further reflecting the light of color B reflected by the dichroic mirror 36B in a predetermined direction, incidence side polarizing plates 39R, 39G and 39G for linearly polarizing the lights of three colors of R, G and B separated by the dichroic mirrors 36R, 36G and 36B, glass plates 40R, 40G and 40B for transmitting the lights of three colors of R, G and B linearly polarized by the incidence side polarizing plates 39R, 39G and 39B, monochrome liquid crystal panels 41R, 41G and 41B for spatially modulating the lights of three colors of R, G and B transmitted by the glass plates 40R, 40G and 40B in accordance with a displayed image, outgoing side polarizing plates 42R, 42G and 42B for transmitting only the light polarized in a predetermined direction, among the lights spatially modulated by the liquid crystal panels 41R, 41G and 41B, a color synthesizing dichroic prism 43 for synthesizing the lights of three colors of R, G and B transmitted by the outgoing side polarizing plates 42R, 42G and 42B and a projection lens 44 for projecting the light synthesized by the color synthesizing dichroic prism 43 onto a screen 13.

The projection type liquid crystal display in this embodiment further comprises cooling fans, though not shown, for keeping off the heat generated from the liquid crystal panels 41R, 41G and 41B. The liquid crystal panels 41R, 41G and 41B are driven by a predetermined drive circuit which is not shown. Depending on orientation directions of liquid crystal molecules within the liquid crystal panels 41R, 41G and 41B, phase shift plates are provided between the liquid crystal panel 41R and the outgoing side polarizing plate 42R, between the liquid crystal panel 41G and the outgoing side polarizing plate 42G and between the liquid crystal panel 41B and the outgoing side polarizing plate 42B, respectively, for providing different phases in accordance with the orientation directions of the liquid crystal molecules within the liquid crystal panels 41R, 41G and 41B.

The color synchronizing dichroic prism 43 is a cubic shaped prism. The prism 43 has incidence surfaces 43R, 43G and 43B on which lights of three colors of R, G and B are incident, respectively. The incidence surface 43R is perpendicular to the incidence surface 43G, and the incidence surfaces 43G is perpendicular to the incidence surface 43B. The incidence surface 43R is parallel to the incidence surface 43B. The incidence side polarizing plate 39R, the glass plate 40R, the liquid crystal panel 41R and the outgoing side polarizing plate 42R are arranged integrally to face one incidence surface 43R of the color synchronizing dichroic prism 43. Specifically, one surface of the outgoing side polarizing plate 42R is fixedly attached to the incidence surface 43R of the color synchronizing dichroic prism 43 by predetermined adhesive agent. The other surface of the outgoing side polarizing plate 42R and one surface of the glass plate 40R are fixedly attached to front and rear surfaces of the liquid crystal panel 41R, respectively. The incidence side polarizing plate 39R is fixedly attached to the other surface of the glass plate 40R.

The incidence side polarizing plate 39G, the glass plate 40G, the liquid crystal panel 41G and the outgoing side polarizing plate 42G are arranged integrally with one another to face the incidence surface 43G of the color synchronizing dichroic prism 43. Specifically, one surface of the outgoing side polarizing plate 42G is fixedly attached to the incidence surface 43G of the color dichroic prism 43 by predetermined adhesive agent. The other surface of the outgoing side polarizing plate 42G and one surface of the glass plate 40G are fixedly attached to front and rear surfaces of the liquid crystal panel 41G. The incidence side polarizing plate 39G is fixedly attached to the other surface of the glass plate 40G.

The incidence side polarizing plate 39B, the glass plate 40B, the liquid crystal panel 41B and the outgoing side polarizing plate 42B are arranged integrally with one another to face the incidence surface 43B of the color synchronizing dichroic prism 43. Specifically, one surface of the outgoing side polarizing plate 42B is fixedly attached to the incidence surface 43B of the color dichroic prism 43 by predetermined adhesive agent. The other surface of the outgoing side polarizing plate 42B and one surface of the glass plate 40B are fixedly attached to front and rear surfaces of the liquid crystal panel 41B. The incidence side polarizing plate 39B is fixedly attached to the other surface of the glass plate 40B.

As can be seen from the above, in this embodiment, the incidence side polarizing plates 39R, 39G and 39B, the glass plates 40R, 40G and 40B, the liquid crystal panels 41R, 41G and 41B, the outgoing side polarizing plates 42R, 42G and 42B and the color synchronizing dichroic prism 43 are integral with one another. Due to the integral arrangement, it is possible to reduce the size of the optical system and to prevent contaminants such as dust and dirt from being attached to the front and rear surfaces of the liquid crystal panels 41R, 41G and 41B and to the light incidence surface of the color synchronizing dichroic prism 43.

The color synchronizing dichroic prism 43 and the glass plates 40R, 40G and 40B are preferably made of members which can easily conduct the heat generated from the liquid crystal panels 41R, 41G and 41B (such as a member of heat conductivity of not less than 1.0 W/m·K), respectively. These glass members involve, for example, a borosilicate crown glass (such as BK 7 of Shot Company) and a borosilicate glass (such as #7059 of Corning Company). Each of the glass plates 40R, 40G and 40B have preferably a thickness of 1 mm or more in consideration of, for example, the influence of stress caused by the heat generated from each of the liquid crystal panels 41R, 41G and 41B. As can be seen from the above description, in this embodiment, the color synchronizing dichroic prism 43 and the glass plates 40R, 40G and 40B installed integrally with the liquid crystal panels 41R, 41G and 41B, respectively, are made of members with good heat conductivity, thereby facilitating the removal of the heat discharged from the liquid crystal panels 41R, 41G and 41B. For purposes of removing the heat, cooling member may be further provided in the predetermined positions of either the color synchronizing dichroic prism 43 or the glass plates 40R, 40G and 40B, respectively.

Figure 7:
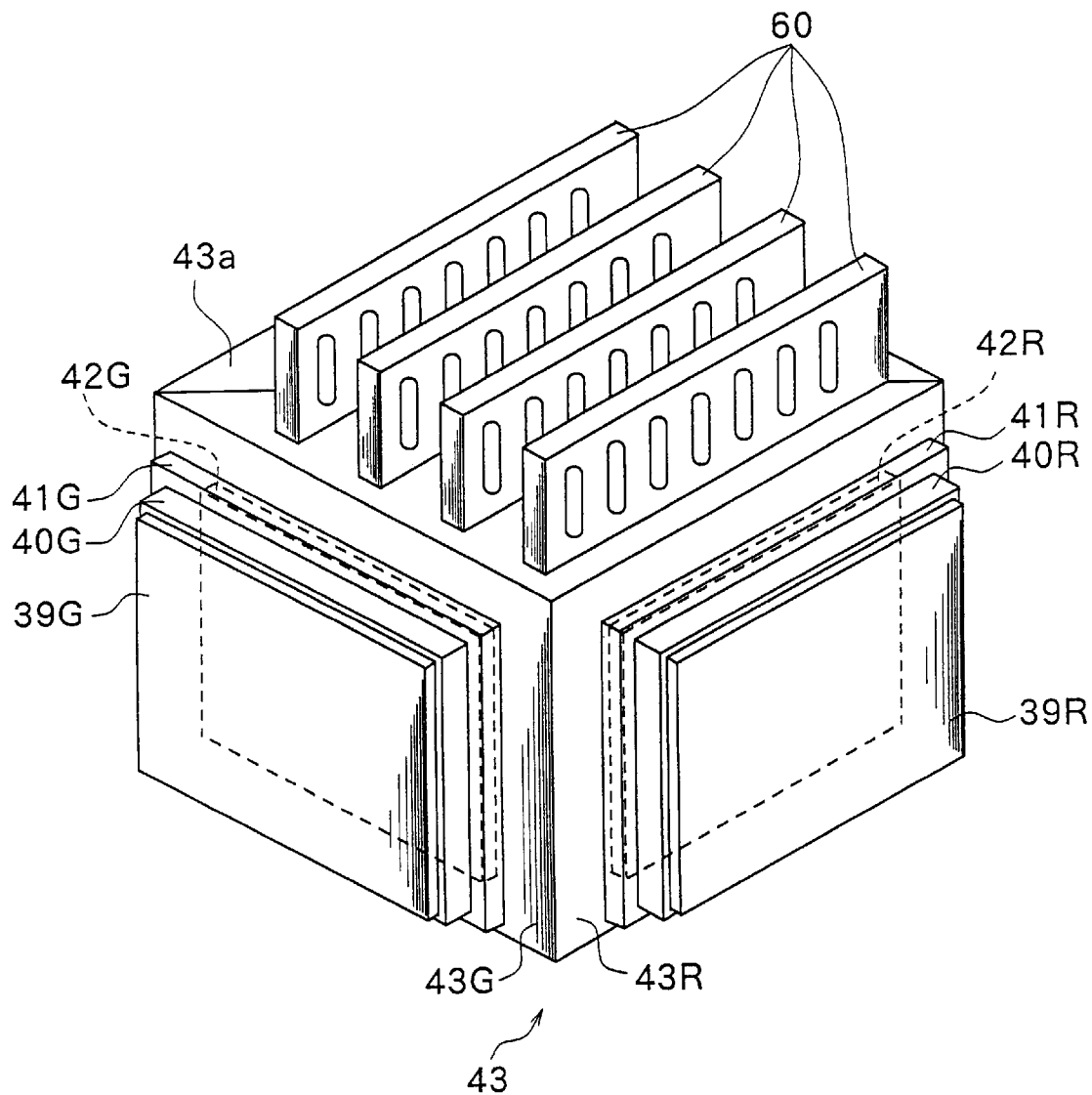
FIG. 7 is a perspective view showing the structure of the periphery of a liquid crystal panel in the projection type liquid crystal display of FIG. 6.
Figure 8:
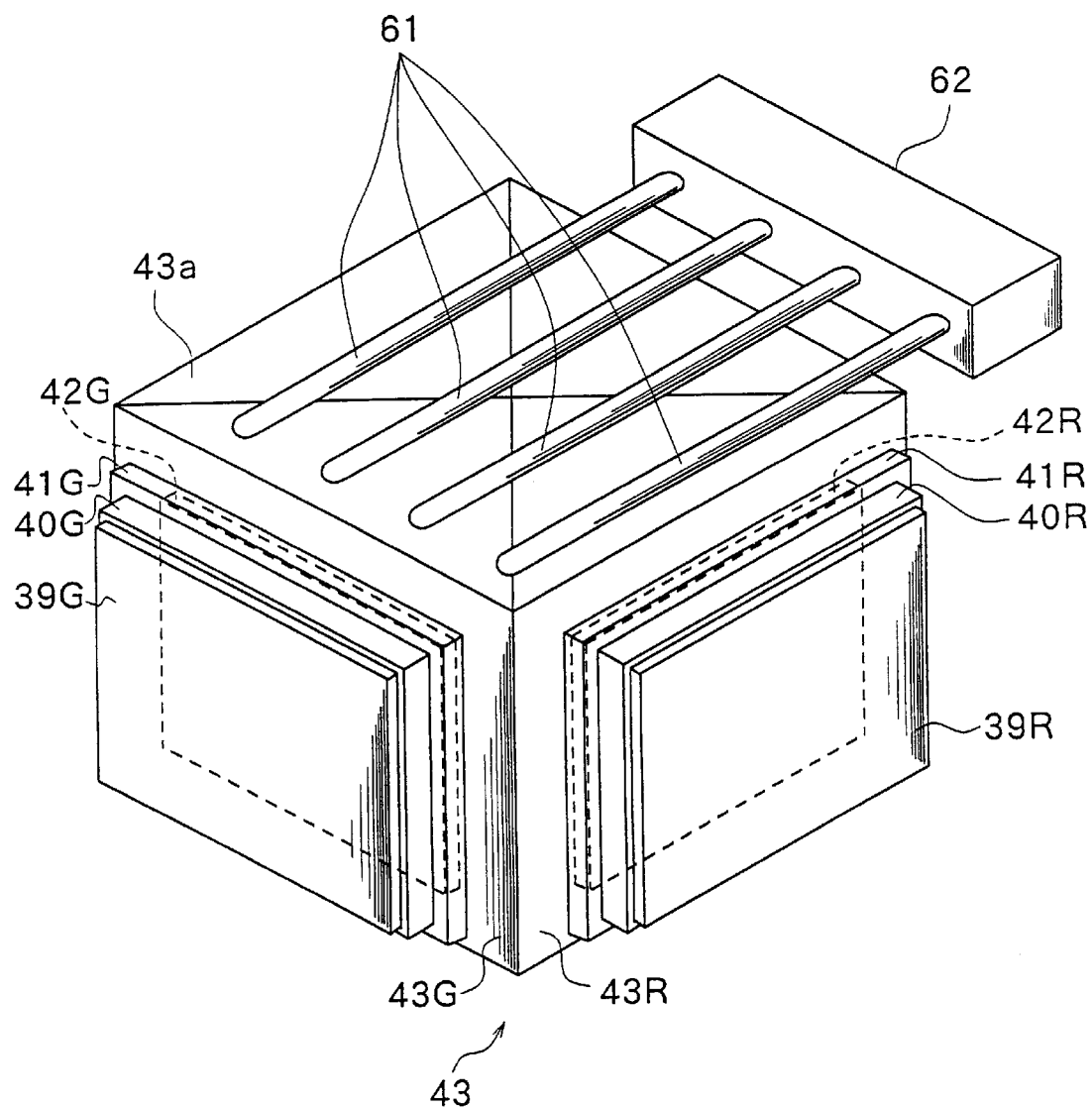
FIG. 8 is a perspective view showing another example of the structure of the periphery of the liquid crystal panel in the projection type liquid crystal display of FIG. 6.

FIGS. 7 and 8 are perspective views for showing the peripheral structure of the liquid crystal panel 9 and for explaining an example of installation of a cooling member. In the example shown in FIG. 7, a plurality of radiation shields 60 made of, for example, copper or aluminum are fixedly installed as cooling members on one surface 43$a$ of the color synchronizing dichroic prism 43 that does not contribute to the incidence and emission of light. In the example shown in FIG. 8, a plurality of heat pipes 61 are fixedly installed as cooling members on the surface 43$a$ of the color synchronizing dichroic prism 43. The heat pipes 61 are also connected to a Peltier device 62 serving as a cooling member having a Peltier effect. The cooing members stated above may be provided on another surfaces of the glass plates 40R, 40G and 40B that do not contribute to the light incidence and emission instead of providing the surface 43$a$ of the prism 43.

The function of the projection type liquid crystal display of such a structure as mentioned above will be now described.

As shown in FIG. 6, first, a white light emitted from the light source 31 has ultraviolet and infrared removed therefrom by the UV-IR cut filter 32. The light transmitted by the UV-IR cut filter 32 is diffused by the glass rod integrator 33 and a parallel light having uniform light illuminance distribution is irradiated. Once the parallel light irradiated from the glass rod integrator 33 is converged into the relay lens 34, the parallel light is irradiated as a parallel light having a predetermined width by the collimator lens 35 which forms, together with the relay lens 34, a telecentric optical system.

The parallel light irradiated from the collimator lens 55 is selectively separated by the action of dichroic mirrors 36R, 36G and 36B into lights of three colors of B, R and G which are fundamental colors for color display, respectively. The lights of three colors of B, R and G are linearly polarized by the incidence side polarizing plates 39R, 39G and 39B fixedly attached to the light outgoing sides 43R, 43G and 43B of the color synchronizing dichroic prism 43, respectively. Thereafter, the lights are transmitted by the glass plates 40R, 40G and 40B and incident on the liquid crystal panels 41R, 41G and 41B, respectively. The liquid crystal panels 41R, 41G and 41B spatially modulate lights of three colors of R, G and B in accordance with a displayed image and irradiate them. The lights irradiated from the liquid crystal panels 41R, 41G and 41B are incident on the outgoing side polarizing plates 42R, 42G and 42B, respectively. The lights of three colors of R, G and B transmitted by the outgoing side polarizing plate 42R, 42G and 42B are incident on incident surfaces 43R, 43G and 43B of the color synchronizing dichroic prism 43, respectively. The lights incident on the incidence surfaces 43R, 43G and 43B of the color synchronizing dichroic prism 43 are color-synchronized by the action of the color synchronizing dichroic prism 43 and then projected onto the screen 13 by the projection lens 12.

Next, the cooling function in a case where cooling members are installed in the predetermined position of the color synchronizing dichroic prism 43 will be described.

As shown in FIGS. 7 and 8, the heat generated from the liquid crystal panels 41R, 41G and 41B is conducted to the color synchronizing dichroic prism 43 through the outgoing side polarizing plates 42R, 42G and 42B. The heat thus conducted to the color synchronizing dichroic prism 43 is further conducted to the radiation sheets 60 (in FIG. 7) installed on one surface 43$a$ of the prism 43 that does not contribute to the incidence and irradiation of light or the heat pipes 61 (in FIG. 8) connected to the Peltier device 62. The heat is discharged to the outside of the optical system through these cooling members. By so doing, it is possible to prevent temperature increase caused by the heat generated from the liquid crystal panels 41R, 41G and 41B. As a result, it is possible to prevent a deterioration in the image quality of the liquid crystal panel caused by the temperature increase and to decrease noises deriving from the air blow for cooling.

As described above, in the projection type liquid crystal display in the embodiment according to the present invention, peripheral optical systems of the liquid crystal panels 41R, 41G and 41B, that is, peripheral optical components of the incidence side polarizing plates 39R, 39G and 39B, the glass plates 40R, 40G and 40B, the liquid crystal panels 41R, 41G and 41B, the outgoing side polarizing plates 42R, 42G and 42B and the color synchronizing dichroic prism 43 are all arranged integrally with one another. A smaller-sized optical systems can be therefore realized.

Besides, with integral arrangements of the optical components, it is possible to prevent contaminants such as dusts and dirt from being attached to the surfaces of the liquid crystal panels 41R, 41G and 41B and the incidence surfaces 43R, 43G and 43B. The reason is as follows. The surfaces of the liquid crystal panels 41R, 41G and 41B and the incidence surfaces 43R, 43G and 43B of the color synchronizing dichroic prism 43 are not exposed to the air. Lights of a plurality of colors, which are fundamental colors for color display, are incident on the liquid crystal panels 41R, 41G and 41B through the glass plates 40R, 40G and 40B without contact with the air, respectively. The lights are thereafter incident on the dichroic prism 43 and color-synchronized. This can reduce the surface reflection of light and prevent stray light from occurring without providing the incidence surfaces 43R, 43G and 43G of the color synchronizing dichroic prism 43 with antireflection films, respectively, thereby capable of preventing a deterioration in image quality.

In addition, the color synchronizing dichroic prism 43 and the glass plates 40R, 40G and 40B installed integrally with the liquid crystal panels 41R, 41G and 41B are made of members which can easily conduct the heat generated from the liquid crystal panels 41R, 41G and 41B. The cooling members are provided in predetermined positions of the color synchronizing dichroic prism 43 or of the glass plates 40R, 40G and 40B. Due to this, the heat discharged from the liquid crystal panels 41R, 41G and 41B can be easily removed and a good cooling effect is attained. As a result, it is possible to prevent optical characteristics of the peripheral optical systems of the liquid crystal panels 41R, 41G and 41B from being changed by the heat and to thereby prevent a deterioration in image quality.

By improving the cooling effect, brighter light can be incident on the system and it is possible to realize bright image display. Due to the excellent cooling effect, the burden of the cooling fans is eased and noises and the like resulting from the fans can be reduced. Each surface of the liquid crystal panels 41R, 41G and 41B is installed integrally with the color synchronizing dichroic prism 6 having high heat conductivity and the other surfaces thereof are exposed to the space having low heat conductivity, for example. If so, only one surfaces of the liquid panels 41R, 41G and 41B are cooled with cooling fans more than required and temperature gradients occur on front and rear surfaces of the liquid crystal panels 41R, 41B and 41B. With this, stress occurs to the liquid crystal panels 41R, 41B and 41B, respectively, and the liquid crystal layers become uneven and image quality may possibly deteriorate greatly. In this embodiment, however, the color synchronizing dichroic prism 43 and the glass plates 40R, 40G and 40B are integral with the front and rear surfaces of the liquid crystal panels 41R, 41B and 41B, respectively. The problem mentioned above does therefore hardly occur.

In the projection type liquid crystal display in the embodiment according to the present invention, the structure of the peripheral optical systems of the liquid crystal panels 41R, 41B and 41B can be simplified and an improvement in image quality can be promoted.

The present invention has been described so far while referring to the embodiments. It is noted, however, that the present invention should not be limited to the above-stated embodiments and that various modifications can be made. Although three primary colors of R, G and B serve as a plurality of colors which are fundamental for color display in the embodiments, three colors of, for example, cyanogen (C), Magenta (M) and yellow (Y) may be used as the fundamental colors.

Moreover, in the above-stated embodiments, the glass plate 10 and the glass plates 40R, 40G and 40B such as a borosilicate glass are used as a member attached to the surface of the liquid crystal panel 9 and members attached to the surfaces of the liquid crystal panels 9, respectively. It, however, should not be limited to a glass member. As long as it is a transparent member which transmits at least lights of fundamental colors for color display, it may be applied to the present invention. Besides, in the above embodiments, peripheral optical components of the liquid crystal plate 9 including the glass plate 10 or those of the liquid crystal plates 40R, 40G and 40B including the glass plates 40R, 40G and 40B are fixedly attached by adhesive agent. However, other methods such as fixing the peripheries of the optical components to one another with screws, may be used.

Figure 9:
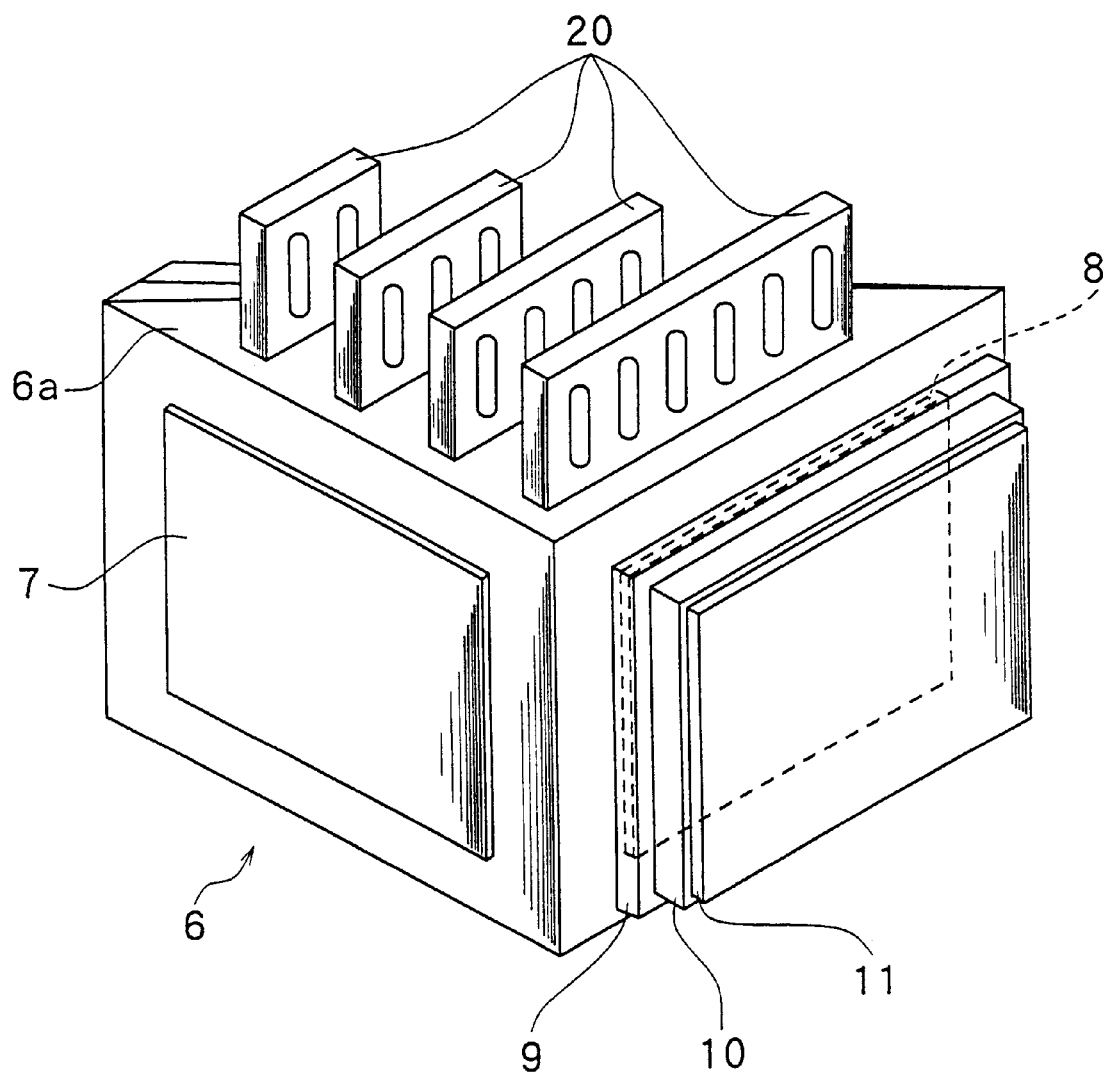
FIG. 9 is a perspective view showing another example of the structure of the periphery of the liquid crystal panel in the projection type liquid crystal display of FIG. 3.

The first embodiment illustrates a case where the phase shift plate 8 is provided on one-side surface of the liquid crystal panel 9 for giving different phases in accordance with orientation directions of liquid crystal molecules within the liquid crystal panel 9. If the orientation directions of the liquid crystal molecules are not required to be given phase shifts, there is no need to provide the phase shift plate 8. In such a case, other optical components except for the phase shift plate 8 may be provided integrally with the light outgoing side of the color separation dichroic prism 6 as in the case of the first embodiment. As shown in FIG. 9, for example, the incidence side polarizing plate 7 may be provided integrally with the light incidence side of the color separation dichroic prism 6 and, at the same time, the remaining optical components may be provided integrally with the light outgoing side of the color separation dichroic prism 6.

Figure 10:
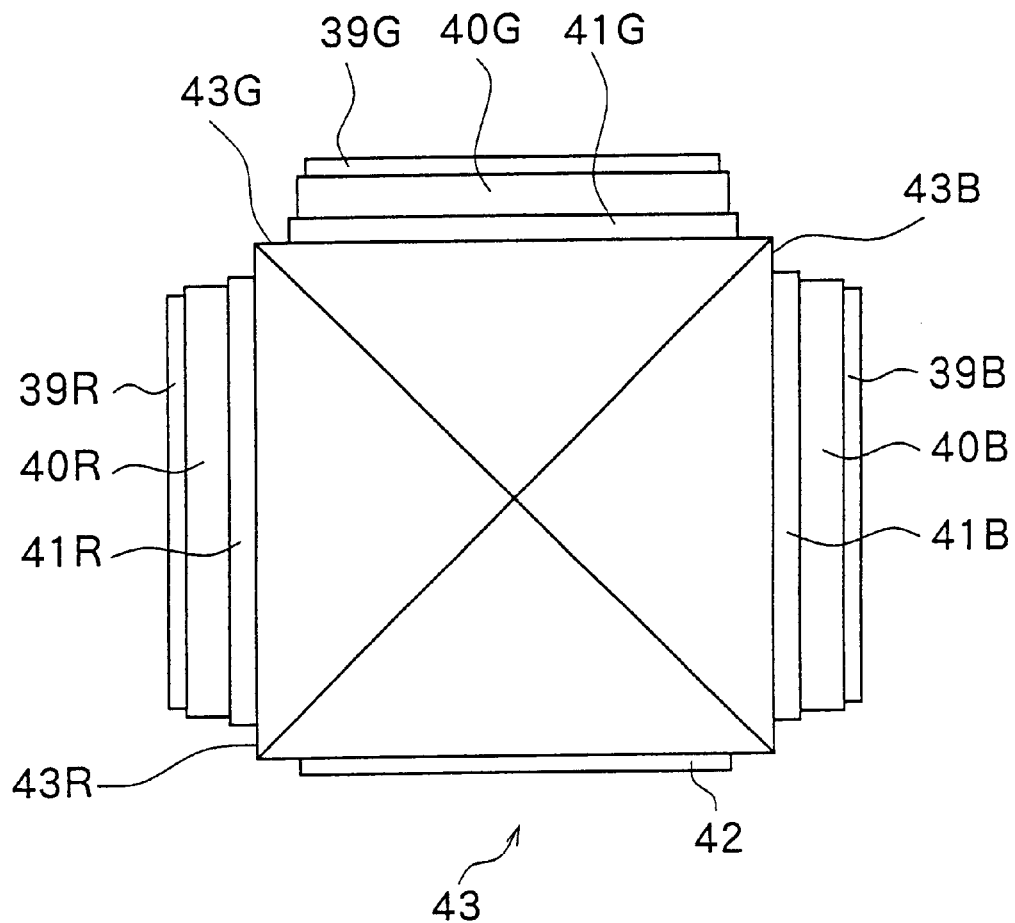
FIG. 10 is a perspective view showing yet another example of the structure of the periphery of the liquid crystal panel in the projection type liquid crystal display of FIG. 6.

Furthermore, the second embodiment illustrates a case where the three outgoing side polarizing plates 42R, 42G and 42B are fixedly attached to and integral with the light incidence surfaces 43R, 43G and 43B of the color synchronizing dichroic prism 43, respectively. As shown in FIG. 10, a single outgoing side polarizing plate 42 common to the respective colors of R, G and B, instead of the three outgoing side polarizing plates 42R, 42G and 42B, may be fixedly attached to and installed integrally with the light outgoing surface of the color synchronizing dichroic prism 43. If so, the optical system of simpler structure can be realized.

As described above, according to projection type liquid crystal display of the present invention, a transparent member is fixedly attached to one of the two surfaces, i.e., those serving as a light incidence surface and a light outgoing surface, of the liquid crystal panel, whereas the other surface thereof is provided actually integrally with the dichroic prism for either separating or synthesizing lights of colors which are fundamental for color display, or provided integrally therewith, through at least one optical component. Due to this, it is possible to simplify the structure and to prevent contaminants such as dust and dirt from being attached to the surface of the liquid crystal panel and that of the dichroic prism. As a result, it is possible to advantageously improve image quality.

Additionally, according to the projection type liquid crystal display of the present invention, cooling members for cooling the liquid crystal panel are provided in the predetermined positions of at least one of the dichroic prism and the transparent member. Due to this, in addition to the advantageous effect as described above, the heat discharged from the liquid crystal panel can be easily removed, an excellent cooling effect can be produced, the optical characteristics of the optical components on the periphery of the liquid crystal panel can be prevented from being changed by the heat and a deterioration in image quality can be prevented. Due to the excellent cooling effect, the display according to the present invention has advantages in that the burden of the cooling fans can be relieved and noises and the like caused by the cooling fans can be reduced.

According to the projection type liquid crystal display of the present invention, a transparent member is fixedly attached to the light outgoing surface of the liquid panel and the light incidence surface of the liquid crystal panel is actually provided integrally with the dichroic prism for separating lights of colors which are fundamental for color display or provided integrally therewith through at least one optical component. Due to this, a plurality of color separation dichroic mirrors and color adjustment and holding mechanisms provided at the mirrors are not required. Compared with the conventional three-panel mode projection type liquid crystal display, it is possible to provide a simple structure and to prevent contaminants such as dusts and dirt from being attached to the surface of the liquid crystal and that of the dichroic prism. As a result, it is possible to advantageously improve image quality.

Finally, according to the projection type liquid crystal display of the present invention, transparent members are fixedly attached to the light outgoing surfaces of a plurality of liquid panels and the light incidence surfaces of the liquid crystal panels are actually provided integrally with a plurality of light incidence surfaces of the dichroic prism for synchronizing lights of a plurality of colors, respectively or provided integrally therewith through at least one optical component, respectively. Due to this, no clearances are given between optical components on the peripheries of the liquid crystal panels as seen in the conventional three-panel mode projection type liquid crystal display. It is also possible to provide a simple structure and to prevent contaminants such as dusts and dirt from being attached to the surfaces of the liquid crystals and that of the dichroic prism. As a result, it is possible to advantageously improve image quality.

Obviously many modifications and variations of the present invention are possible in the light of the above teachings. It is therefore to be understood that within the scope of the appended claims the invention may be practiced otherwise than as specifically described.

What is claimed is:

1. A projection type liquid crystal display comprising:
    a dichroic prism for separating or synchronizing a light to provide fundamental colors for color display;
    a liquid crystal panel having a surface serving as a light incidence surface and a surface serving as a light outgoing surface, a transparent member being fixedly attached to one of the surfaces of the liquid crystal panel, another surface of the liquid crystal panel provided integrally with the dichroic prism through at least one optical component; and
    means for enlarging and projecting a transmitted light from the liquid crystal panel.

2. A projection type liquid crystal display according to claim 1, wherein a cooling member for cooling the liquid crystal panel is arranged in a predetermined position of at least one of the dichroic prism and the transparent member.

3. A projection type liquid crystal display according to claim 2, wherein the cooling member is a radiation shield.

4. A projection type liquid crystal display according to claim 2, wherein the cooling member is a Peltier device.

5. A projection type liquid crystal display according to claim 2, wherein the cooling member is a heat pipe.

6. A projection type liquid crystal display according to claim 1, wherein the dichroic prism comprises a member having heat conductivity of not less than 1.0 W/m·K.

7. A projection type liquid crystal display according to claim 1, wherein the transparent member comprises a glass plate having heat conductivity of not less than 1.0 W/m·K.

8. A projection type liquid crystal display according to claim 1, wherein the optical component is a polarizing plate for linearly polarizing the lights of three colors of B, R and G separated by the dichroic mirror.

9. A projection type liquid crystal display according to claim 1, wherein the optical component is a phase shift plate for providing different phases in accordance with the orientation directions of the liquid crystal molecules with the liquid crystal panels.

10. A projection type liquid crystal display comprising:
    a dichroic prism, having a plurality of light incidence surfaces corresponding to a plurality of colors which are fundamental colors for color display, for synchronizing the plurality of colors incident on the light incidence surfaces; and
    a plurality of liquid crystal panels each having a surface serving as a light incidence surface and a surface serving as a light outgoing surface, a transparent member fixedly attached to the light incidence surface, the light outgoing surface provided integrally with one of the plurality of light incidence surfaces of said dichroic prism directly.

11. A projection type liquid crystal display according to claim 10, wherein a cooling member for cooling the liquid crystal panels is arranged in a predetermined position of at least one of the dichroic prism and the transparent member.

12. A projection type liquid crystal display according to claim 10, wherein the dichroic prism comprises a member having heat conductivity of not less than 1.0 W/m·K.

13. A projection type liquid crystal display according to claim 10, wherein the transparent member comprises a glass plate having heat conductivity of not less than 1.0 W/m·K.

14. A projection type liquid crystal display according to claim 10, wherein the cooling member is a radiation shield.

15. A projection type liquid crystal display according to claim 11, wherein the cooling member is a Peltier device.

16. A projection type liquid crystal display according to claim 11, wherein the cooling member is a heat pipe.

* * * * *